United States Patent
Yao et al.

(10) Patent No.: US 10,926,998 B2
(45) Date of Patent: Feb. 23, 2021

(54) PURE BAMBOO FIBER MATTRESS AND MANUFACTURING METHOD THEREOF

(71) Applicants: Jiyang College Of Zhejiang A&F University, Zhuji (CN); Chongqing Shengfang New Material Tech Co., Ltd., Chongqing (CN)

(72) Inventors: Wenbing Yao, Zhuji (CN); Yiting Zhang, Zhuji (CN)

(73) Assignees: JIYANG COLLEGE OF ZHEJIANG A&F UNIVERSITY, Zhuji (CN); CHONGQING SHENGFANG NEW MATERIAL TECH CO., LTD., Chongqing (CN)

( * ) Notice: Subject to any disclaimer, the term of this patent is extended or adjusted under 35 U.S.C. 154(b) by 111 days.

(21) Appl. No.: 16/205,230

(22) Filed: Nov. 30, 2018

(65) Prior Publication Data
US 2020/0172390 A1   Jun. 4, 2020

(51) Int. Cl.
*B68G 7/02*  (2006.01)
*B68G 3/02*  (2006.01)
(Continued)

(52) U.S. Cl.
CPC .............. *B68G 7/02* (2013.01); *A47C 27/122* (2013.01); *B32B 5/26* (2013.01); *B32B 7/09* (2019.01);
(Continued)

(58) Field of Classification Search
CPC ...... B27J 1/00; B27J 7/00; B68G 7/02; B68G 3/02; B68G 3/00; D04B 1/14;
(Continued)

(56) References Cited

U.S. PATENT DOCUMENTS 5,976,644 A * 11/1999 Sanaee ................. B27J 1/003
                                                            144/333
6,823,908 B2 * 11/2004 Hsu ........................ B27J 1/00
                                                            144/347
(Continued)

FOREIGN PATENT DOCUMENTS

| CN | 1375578 A | * | 10/2002 | ............ D01B 1/50 |
| CN | 101538744 A | * | 9/2009 | |
| JP | 2004306548 A | * | 11/2004 | |

*Primary Examiner* — Amy Vanatta
(74) *Attorney, Agent, or Firm* — Leong C. Lei

(57) ABSTRACT

A pure bamboo fiber mattress and a manufacturing method thereof are disclosed. The manufacturing method includes the following steps: trimming and cleaning bamboo; sawing; splitting; slicing the bamboo strips; knitting; softening; directional fiber opening; dry cleaning, drying and removing dust; stacking; sewing and packing. The pure bamboo fiber mattress includes a surface layer, a transition layer, a core layer, another transition layer and another surface layer that are arranged in sequence from top to bottom. The surface layer includes 3-5 layers of first bamboo mesh fabric laid one on top of another. The transition layer includes 3-8 layers of second bamboo mesh fabric laid one on top of another. The core layer includes 3-8 layers of third bamboo mesh fabric laid one on top of another. The first bamboo mesh fabric, the second bamboo mesh fabric and the third bamboo mesh fabric are made of bamboo fibers.

3 Claims, 1 Drawing Sheet

(51) Int. Cl.
  *A47C 27/12* (2006.01)
  *B32B 5/26* (2006.01)
  *B32B 37/18* (2006.01)
  *B32B 38/16* (2006.01)
  *B32B 7/09* (2019.01)

(52) U.S. Cl.
  CPC ............ *B32B 37/18* (2013.01); *B32B 38/162* (2013.01); *B68G 3/02* (2013.01); *B32B 2262/065* (2013.01); *D03D 2700/0133* (2013.01); *D10B 2201/10* (2013.01); *D10B 2505/08* (2013.01)

(58) Field of Classification Search
  CPC .......... D04B 21/20; D04B 1/22; D04B 39/00; B27K 9/002; B27K 9/00; B32B 5/26; B32B 37/18; B32B 38/162; B32B 7/09; B32B 38/164; B32B 2262/065; B32B 2260/026; B32B 2262/06; B32B 2305/182; B32B 2038/166; B32B 38/0004; A47C 27/122; A47C 27/127; D10B 2505/08; D10B 2201/10; D01B 1/00; D01B 1/10; D01B 9/00; B27M 1/08; D01C 1/00; D03D 1/00; D03D 13/00; D03D 15/02; D03D 15/00; D03D 2700/0133; D03D 2700/0174; D03D 1/0017; D03D 11/00; D03D 25/00; D05B 11/00; D05B 11/005; D05B 95/00; D05B 95/04; D05B 97/08
  See application file for complete search history.

(56) References Cited

U.S. PATENT DOCUMENTS

| | | | |
|---|---|---|---|
| 9,630,337 B2 * | 4/2017 | Peng | D01C 1/00 |
| 2008/0295982 A1 * | 12/2008 | Lee | D21C 5/00 |
| | | | 162/60 |
| 2010/0178451 A1 * | 7/2010 | Li | B27N 5/00 |
| | | | 428/106 |
| 2015/0128827 A1 * | 5/2015 | Sun | B27M 1/06 |
| | | | 106/18.11 |
| 2016/0220030 A1 * | 8/2016 | Chenfu | A47C 27/00 |
| 2017/0073852 A1 * | 3/2017 | Uno | D02G 3/04 |
| 2019/0054649 A1 * | 2/2019 | Yao | B27J 1/00 |
| 2019/0055670 A1 * | 2/2019 | Yao | D01B 1/36 |
| 2019/0264350 A1 * | 8/2019 | Zhang | D01B 9/00 |
| 2020/0217010 A1 * | 7/2020 | Lu | B65D 9/10 |

* cited by examiner

PURE BAMBOO FIBER MATTRESS AND MANUFACTURING METHOD THEREOF

BACKGROUND OF THE INVENTION

1. Field of the Invention

The present invention relates to a pure bamboo fiber mattress and a manufacturing method thereof.

2. Description of the Prior Art

With the changes in the market, mattresses have developed from traditional sponge mattresses and soft spring mattresses to natural plant fiber mattresses that are more natural and comfortable to meet the needs of human health. Palm mattresses are widely used, but because palm fiber contains a lot of nutrients such as sugar and protein, they are prone to mold and grow insects. These shortcomings cause palm plant fiber mattresses to mold and grow insects. In severe cases, the eggs are hatched to invade the human body. As a new material with high performance, bamboo fibers have many excellent properties, good air permeability, instant water absorption, strong abrasion resistance, etc., and have natural antibacterial, non-irritating, antibacterial, anti-mony, anti-allergic, deodorant and UV resistant functions. When in use, the bamboo fiber mattress can quickly adjust the moisture from the human body during sleep, and it is breathable and moisture-proof. It is comfortable and dry in summer.

At present, the bamboo fiber mattress on the market is generally made of low-melting fibers (4080) mixed with a mesh. It is unable to manufacture a mattress with 100% bamboo fibers, so that the benefits of the bamboo fiber mattress cannot be maximized. In view of the desire for returning to nature and the demands for low cost and high performance of mattresses, the present invention provides a pure bamboo fiber mattress.

SUMMARY OF THE INVENTION

According to one aspect of the present invention, a method for manufacturing a pure bamboo fiber mattress is provided.

A method for manufacturing a pure bamboo fiber mattress, comprising the following steps:

(1) trimming and cleaning bamboo: using fresh bamboo of 1-2 years old, removing branches and bamboo leaves of the bamboo, and cleaning an outer surface of the bamboo;

(2) sawing: using a circular saw to saw the bamboo into a bamboo tube having a length of 2-4 in;

(3) splitting: using a splitting machine to hit and split the bamboo tube into pieces, dividing the bamboo tube into 8-16 parts in a cross-sectional direction of the bamboo tube to form bamboo strips each having a width of 1-2 cm;

(4) slicing the bamboo strips: using a slicer to slice the bamboo strips into three types of long bamboo laminations as a surface layer, a transition layer and a core layer; wherein (5) knitting: putting the long bamboo laminations into a knitting machine, wherein a gap of 5 mm is kept between every adjacent two of the long bamboo laminations to form a bamboo mesh;

(6) softening: using an alkaline solution to boil the bamboo mesh for 2-3 hours;

(7) directional fiber opening: using a directional fiber opening machine to perform a directional fiber opening treatment for the softened bamboo mesh to obtain three types of bamboo mesh fabric of the surface layer, the transition layer and the core layer;

wherein, the bamboo mesh fabric of the surface layer is defined as a first bamboo mesh fabric, the bamboo mesh fabric of the transition layer is defined as a second bamboo mesh fabric, and the bamboo mesh fabric of the core layer is a defined as third bamboo mesh fabric;

(8) dry cleaning, drying and removing dust: putting the bamboo mesh fabric into a dry cleaning machine to remove impurities on a surface of a fiber; after drying the surface of the fiber naturally at room temperature, the bamboo fiber fabric being dried in a dryer at 50° C.-70° C.;

(9) stacking: laying the surface layer, the transition layer, the core layer, another transition layer and another surface layer in sequence from top to bottom to obtain a blank; wherein the surface layer: laying 3-5 layers of the first bamboo mesh fabric, the surface layer having a thickness of 6-10 mm;

the transition layer: laying 3-8 layers of the second bamboo mesh fabric, the transition layer having a thickness of 20-32 mm;

the core layer 3: laying 3-8 layers of the third bamboo mesh fabric, the core layer having a thickness of 40-60 mm;

(10) sewing and packing: using a bamboo fiber rope for multi-layer dense sewing of the blank, cutting and edge banding, packing and storing.

Preferably, in the step (4), the bamboo strips for the surface layer, the transition layer and the core layer are sliced as follows:

the surface layer: the bamboo strips being sliced into 4-8 laminations each having a thickness of 1-2 mm;

the transition layer: the bamboo strips being sliced into 2-4 laminations each having a thickness of 3-4 mm;

the core layer: the bamboo strips being not sliced.

Preferably, in the step (6), the alkaline solution is 3% NaOH or $Na_2CO_3$ solution.

According to another aspect of the present invention, a pure bamboo fiber mattress is provided.

A pure bamboo fiber mattress comprises a surface layer, a transition layer, a core layer, another transition layer and another surface layer that are arranged in sequence from top to bottom. The surface layer comprises 3-5 layers of first bamboo mesh fabric laid one on top of another. The transition layer comprises 3-8 layers of second bamboo mesh fabric laid one on top of another. The core layer comprises 3-8 layers of third bamboo mesh fabric laid one on top of another.

Preferably, the surface layer has a thickness of 6-10 mm, the transition layer has a thickness of 20-32 mm, and the core layer has a thickness of 40-60 mm.

Preferably, the first bamboo mesh fabric, the second bamboo mesh fabric and the third bamboo mesh fabric are made of bamboo fibers.

The fiber opening of the invention is more efficient. The directional rolling and opening are performed many times to ensure that the thickness of the bamboo fiber after opening is uniform. The production process of the invention is efficient and the cost is low. The original ecology pure bamboo fiber mattress produced by the invention is formed by combining bamboo fiber fabric and bamboo fibers, and does not contain other fibers. The pure bamboo fiber mattress can exert the advantages of bamboo fibers, such as resistance to drying, humidity adjustment, insect proof, anti-mite and not easy to deform. The pure bamboo fiber mattress is eco-friendly and green, which is good for health, cost-effective and has high market value.

BRIEF DESCRIPTION OF THE DRAWINGS

Embodiments of the present invention will now be described, by way of example only, with reference to the accompanying drawings.

DETAILED DESCRIPTION OF THE PREFERRED EMBODIMENTS

Figure 1:
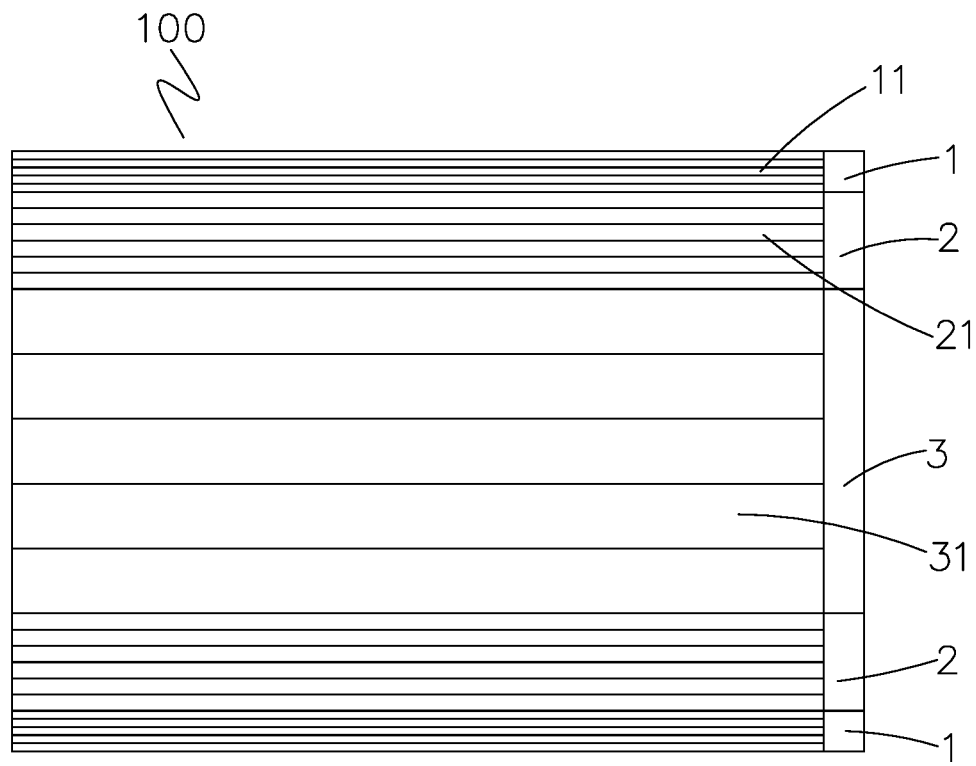
FIG. 1 is a schematic view of the pure bamboo fiber mattress of the present invention.

Referring to FIG. 1, the present invention discloses a pure bamboo fiber mattress 100. The pure bamboo fiber mattress 100 comprises a surface layer 1, a transition layer 2, a core layer 3, another transition layer 2, and another surface layer 1 that are arranged in sequence from top to bottom. The surface layer 1 comprises 3-5 layers of first bamboo mesh fabric 11 laid one on top of another. The transition layer 2 comprises 3-8 layers of second bamboo mesh fabric 21 laid one on top of another. The core layer 3 comprises 3-8 layers of third bamboo mesh fabric 31 laid one on top of another. The first bamboo mesh fabric 11, the second bamboo mesh fabric 21 and the third bamboo mesh fabric 31 are made of bamboo fibers. The surface layer 1 has a thickness of 6-10 mm. The transition layer 2 has a thickness of 20-32 mm. The core layer 3 has a thickness of 40-60 mm.

Figure 2:
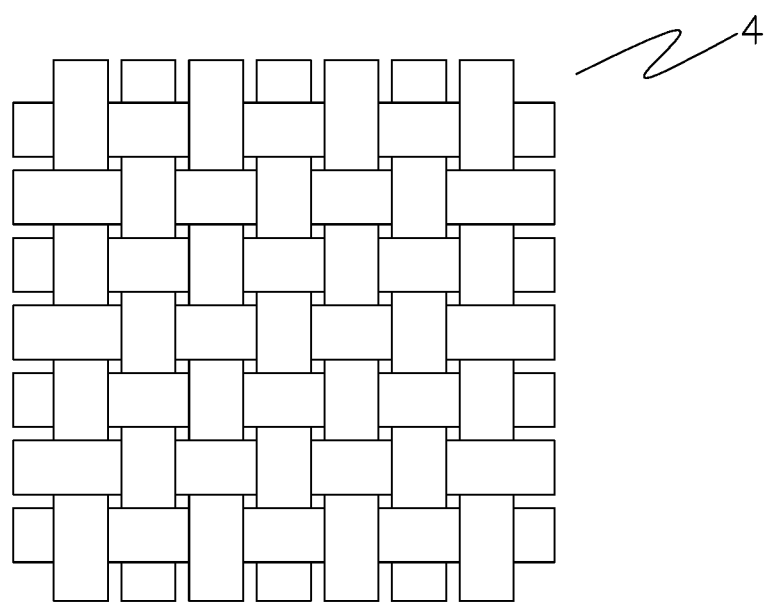
FIG. 2 is a schematic view of the bamboo mesh of the present invention.

Referring to FIGS. 1-2, a method for manufacturing a pure bamboo fiber mattress, comprising the following steps:

1. trimming and cleaning bamboo comprising using fresh bamboo of 1-2 years old, removing branches and bamboo leaves of the bamboo, and cleaning the outer surface of the bamboo; the bamboo including economic bamboo such as Moso Bamboo, Omei Mountain Bamboo, Yellow Bamboo, Green Bamboo, and so on;

2. sawing comprising using a circular saw to saw the bamboo into a bamboo tube having a length of 2-4 m;

3. splitting comprising using a splitting machine to hit and split the bamboo tube into pieces, dividing the bamboo tube into 8-16 parts in a cross-sectional direction of the bamboo tube to form bamboo strips each having a width of 1-2 cm;

4. slicing the bamboo strips comprising using a slicer to slice the bamboo strips into three types of long bamboo laminations as a surface layer 1, a transition layer 2 and a core layer 3; wherein the surface layer 1: the bamboo strips are sliced into 4-8 laminations each having a thickness of 1-2 mm;

the transition layer 2: the bamboo strips are sliced into 2-4 laminations each having a thickness of 3-4 mm;

the core layer 3: the bamboo strips are not sliced.

5. weaving comprising putting the long bamboo laminations into a weaving machine, wherein a gap of 5 mm is kept between every adjacent two of the long bamboo laminations. The gap of 5 mm makes the specification of the manufactured bamboo fiber fabric uniform and controllable, and a certain gap is left to make the fiber opening more complete, and the whole is continuous and uninterrupted. As long as the bamboo laminations are continuously added, in theory, the length or width of the bamboo laminations after woven may be infinitely long. Therefore, the length or width of the finished bamboo fiber fabric can be controlled according to the needs to form a bamboo mesh 4;

6. softening comprising using an alkaline solution to boil the bamboo mesh 4 for 2-3 hours, obtaining a better softening effect; wherein the alkaline solution is 3% NaOH or $Na_2CO_3$ solution;

7. directional fiber opening comprising using a directional fiber opening machine to perform a directional fiber opening treatment for the softened bamboo mesh 4 to obtain three types of bamboo mesh fabric of the surface layer 1, the transition layer 2 and the core layer 3. The directional fiber opening machine can fully open the fibers of the bamboo mesh 4 to ensure the quality and the uniformity of the bamboo fibers after fiber opening and to ensure the continuity and integrity of the bamboo fibers after directional fiber opening;

wherein, the bamboo mesh fabric of the surface layer 1 is defined as a first bamboo mesh fabric 11, the bamboo mesh fabric of the transition layer 2 is defined as a second bamboo mesh fabric 21, and the bamboo mesh fabric of the core layer 3 is defined as a third bamboo mesh fabric 31;

8. dry cleaning, drying and removing dust comprising putting the bamboo mesh fabric into a dry cleaning machine to remove impurities on the surface of a fiber; after drying the surface of the fiber naturally at room temperature, bamboo fiber fabric being dried in a dryer at 50° C.-70° C.; due to the previous softening and fiber opening, the bamboo fibers after the cleaning process have a very high water content, and the wet bamboo fibers have poor mechanical properties and are easy to be broken, so they are dried to ensure the quality of the fibers;

9. stacking comprising laying the surface layer 1, the transition layer 2, the core layer 3, another transition layer 2 and another surface layer 1 in sequence from top to bottom to obtain a blank; wherein, the surface layer 1 is formed by laying 3-5 layers of the first bamboo mesh fabric 11, the thickness of the surface layer 1 is 6-10 mm;

the transition layer 2 is formed by laying 3-8 layers of the second bamboo mesh fabric 21, the thickness of the transition layer 2 is 20-32 mm;

the core layer 3 is formed by laying 3-8 layers of the third bamboo mesh fabric 31, the thickness of the core layer 3 is 40-60 min;

10. sewing and packing comprising using a bamboo fiber rope for multi-layer dense sewing of the blank, cutting and edge banding, packing and storing.

The bamboo mesh fabric of the surface layer 1 consists of the most layers, and it is the thinnest, the best quality and the softest. The bamboo mesh fabric of the transition layer 2 consists of few layers, and it is thicker. The core layer 3 is a bamboo mesh fabric obtained by opening the bamboo mesh 4 without lamination. Although it is rough but of good quality, the core layer 3 not only reduces the cost, but also achieves better quality of the mattress 100 as a whole.

The invention softens the bamboo mesh in an effective softening manner, so that the fiber opening is more efficient. The directional rolling and opening are performed many times to ensure that the thickness of the bamboo fiber after opening is uniform. The bamboo mesh fabric is subjected to dry cleaning, drying and dust removal to obtain a high quality bamboo mesh fabric. The production process of the invention is efficient and the cost is low. The original ecology pure bamboo fiber mattress 100 produced by the invention is formed by combining bamboo fiber fabric and bamboo fibers, and does not contain other fibers. The pure bamboo fiber mattress 100 can exert the advantages of bamboo fibers, resistance to drying, humidity adjustment, insect proof, anti-mite and not easy to deform. The pure bamboo fiber mattress 100 is eco-friendly and green, which is good for health, cost-effective and has high market value.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for manufacturing a pure bamboo fiber mattress, comprising the following steps:
   1. trimming and cleaning bamboo comprising using fresh bamboo of 1-2 years old, removing branches and bamboo leaves of the bamboo, and cleaning an outer surface of the bamboo;
   2. sawing comprising using a circular saw to saw the bamboo into a bamboo tube having a length of 2-4 m;
   3. splitting comprising using a splitting machine to hit and split the bamboo tube into pieces, dividing the bamboo tube into 8-16 parts in a cross-sectional direction of the bamboo tube to form bamboo strips each having a width of 1-2 cm;
   4. slicing the bamboo strips comprising using a slicer to slice the bamboo strips into three types of long bamboo laminations as a surface layer, a transition layer and a core layer;
   5. weaving comprising putting the long bamboo laminations into a weaving machine, wherein a gap of 5 mm is kept between every adjacent two of the long bamboo laminations to form a bamboo mesh;
   6. softening comprising using an alkaline solution to boil the bamboo mesh for 2-3 hours;
   7. directional fiber opening comprising using a directional fiber opening machine to perform a directional fiber opening treatment for the softened bamboo mesh to obtain three types of bamboo mesh fabric of the surface layer, the transition layer and the core layer;
   wherein, the bamboo mesh fabric of the surface layer is defined as a first bamboo mesh fabric, the bamboo mesh fabric of the transition layer is defined as a second bamboo mesh fabric, and the bamboo mesh fabric of the core layer is a defined as third bamboo mesh fabric;
   8. dry cleaning, drying and removing dust comprising putting the bamboo mesh fabric into a dry cleaning machine to remove impurities on a surface of a fiber; after drying the surface of the fiber naturally at room temperature, the bamboo mesh fabric being dried in a dryer at 50° C.-70° C.;
   9. stacking comprising laying the surface layer, the transition layer, the core layer, another transition layer and another surface layer in sequence from top to bottom to obtain a blank; wherein
   the surface layer is formed by laying 3-5 layers of the first bamboo mesh fabric, the surface layer having a thickness of 6-10 mm;
   the transition layer is formed by laying 3-8 layers of the second bamboo mesh fabric, the transition layer having a thickness of 20-32 mm;
   the core layer is formed by laying 3-8 layers of the third bamboo mesh fabric, the core layer having a thickness of 40-60 mm;
   10. sewing and packing comprising using a bamboo fiber rope for multi-layer dense sewing of the blank, cutting and edge banding, packing and storing.

2. The method as claimed in claim 1, wherein in the step 4, the bamboo strips of the surface layer are further sliced into 4-8 laminations each having a thickness of 1-2 mm, the bamboo strips of the transition layer are further sliced into 2-4 laminations each having a thickness of 3-4 mm, and the bamboo strips of the core layer are not further sliced.

3. The method as claimed in claim 1, wherein in the step 6, the alkaline solution is 3% NaOH or $Na_2CO_3$ solution.

* * * * *